(12) United States Patent
Buck

(10) Patent No.: US 12,545,175 B2
(45) Date of Patent: Feb. 10, 2026

(54) MOTOR VEHICLE HAVING A PROJECTION UNIT, AND METHOD FOR OPERATING A MOTOR VEHICLE

(71) Applicant: Bayerische Motoren Werke Aktiengesellschaft, Munich (DE)

(72) Inventor: Alexander Buck, Garching bei Muenchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 189 days.

(21) Appl. No.: 18/288,408

(22) PCT Filed: Jul. 29, 2022

(86) PCT No.: PCT/EP2022/071300
§ 371 (c)(1),
(2) Date: Oct. 26, 2023

(87) PCT Pub. No.: WO2023/012047
PCT Pub. Date: Feb. 9, 2023

(65) Prior Publication Data
US 2024/0208401 A1  Jun. 27, 2024

(30) Foreign Application Priority Data

Aug. 6, 2021 (DE) ...................... 10 2021 120 549.2

(51) Int. Cl.
*B60Q 1/26* (2006.01)
*B60Q 1/50* (2006.01)

(52) U.S. Cl.
CPC ............. *B60Q 1/2603* (2013.01); *B60Q 1/50* (2013.01); *B60Q 2400/50* (2013.01)

(58) Field of Classification Search
CPC .... B60Q 1/2603; B60Q 1/50; B60Q 2400/50; B60Q 1/2665; B60Q 1/5035; B60Q 3/70;
(Continued)

(56) References Cited

U.S. PATENT DOCUMENTS 10,223,915 B2 * 3/2019 Haines ................... B60Q 1/324
2012/0044090 A1    2/2012 Kahler et al.
(Continued)

FOREIGN PATENT DOCUMENTS

CN           111692569 A      9/2020
DE    10 2010 034 853 A1     2/2012
(Continued)

OTHER PUBLICATIONS

International Search Report (PCT/ISA/210) issued in PCT Application No. PCT/EP2022/071300 dated Nov. 24, 2022 with English translation (6 pages).
(Continued)

*Primary Examiner* — Renan Luque
(74) *Attorney, Agent, or Firm* — Crowell & Moring LLP

(57) ABSTRACT

A motor vehicle has a projection unit for projecting graphical or character-based information on a projection surface. The projection unit is connected to a monitoring circuit of the motor vehicle that is configured to project the graphical or character-based information. The monitoring circuit includes a brightness sensor for determining a value for the ambient brightness around the motor vehicle and a computer unit for controlling, on the basis of the value for the ambient brightness received from the brightness sensor, the size of the projection on the projection surface due to the projection unit.

12 Claims, 2 Drawing Sheets

(58) Field of Classification Search
CPC ............ B60Q 2900/30; B60Q 2900/10; B60Q 2300/054; B60Q 1/44; B60Q 1/38; B60Q 1/32; B60Q 1/2607; B60Q 1/247; B60Q 1/143; B60Q 1/0088; B60Q 1/0023; H05B 45/56; G09F 21/049; G09F 21/048; G09F 21/04; G09F 13/20; G09F 13/04; G09F 13/02; G03B 21/28; G03B 21/145; F21Y 2115/10; F21W 2103/60; F21W 2103/35; F21W 2103/20; F21S 45/43; F21S 45/10; F21S 43/195; B60R 2001/1253; B60R 11/04; B60R 1/26; B60R 1/1207
See application file for complete search history.

(56) References Cited

U.S. PATENT DOCUMENTS

| | | | | |
|---|---|---|---|---|
| 2017/0210282 | A1* | 7/2017 | Rodriguez Barros | B60Q 1/324 |
| 2018/0118095 | A1* | 5/2018 | Kunii | B60Q 1/085 |
| 2018/0257547 | A1* | 9/2018 | Suzuki | B60Q 1/547 |
| 2019/0009714 | A1 | 1/2019 | Sakata et al. | |
| 2019/0263318 | A1 | 8/2019 | Brill et al. | |
| 2020/0047807 | A1 | 2/2020 | Kim | |
| 2020/0070716 | A1 | 3/2020 | Sakata et al. | |
| 2022/0009406 | A1 | 1/2022 | Harada et al. | |

FOREIGN PATENT DOCUMENTS

| | | |
|---|---|---|
| DE | 10 2016 221 918 A1 | 5/2018 |
| DE | 10 2018 105 563 A1 | 9/2018 |
| DE | 11 2017 006 529 T5 | 9/2019 |
| DE | 10 2018 220 813 A1 | 2/2020 |
| DE | 10 2018 217 243 A1 | 4/2020 |
| DE | 10 2019 216 478 A1 | 4/2021 |
| EP | 2 674 328 A2 | 12/2013 |
| EP | 3 090 900 A1 | 11/2016 |
| WO | WO 2020/100655 A1 | 5/2020 |

OTHER PUBLICATIONS

German-language Written Opinion (PCT/ISA/237) issued in PCT Application No. PCT/EP2022/071300 dated Nov. 24, 2022 with English translation (11 pages).

German Search Report issued in German Application No. 10 2021 120 549.2 dated May 2, 2022 with partial English translation (11 pages).

\* cited by examiner

MOTOR VEHICLE HAVING A PROJECTION UNIT, AND METHOD FOR OPERATING A MOTOR VEHICLE

BACKGROUND AND SUMMARY

The present invention relates to a motor vehicle having at least one projection unit for projecting graphical or visual information onto a projection surface. The invention furthermore relates to a method for operating such a motor vehicle.

Such a motor vehicle is known for example from DE 10 2010 034 853 A1. In this known motor vehicle, the projector is connected to a monitoring circuit of the motor vehicle in order to project information determined by the monitoring circuit in real time as the graphical or visual information. Any information that would conventionally be displayed on a dashboard of the motor vehicle may be considered as such information. A road surface, a wall or the like is in particular used as projection surface. A headlight and/or at least one rear light of the motor vehicle are designed as digital projectors in order to make the determined information visible on the area onto which the light shines. Devices for recording the brightness of the projection surface and for controlling the light intensity with which the graphical or visual information is projected, based on the recorded brightness, promote the reliable perception of the projected information by the driver. A camera for recognizing road signs, in connection with an image evaluation system for the images delivered by the camera, is provided for recording the brightness.

In the abovementioned procedure, a headlight and/or a rear light of the motor vehicle are used as projectors. These ensure that the available luminous flux in various ambient conditions is high enough to generate the projection in a readily recognizable manner. If using projection units having limited luminous flux, as are used for example to generate what are known as light carpets on the road surface to the side of the vehicle, then the quality of the information displayed by these projection units depends on the ambient conditions. In order to ensure the quality of a projection, this should however be perceptible uniformly to an observer in the greatest possible number of different ambient conditions.

An object of the invention is to specify a motor vehicle in which an installed projection unit enables a projection that is able to be recognized with a similar quality in a wide variety of ambient conditions.

A further object is to specify a method for operating a motor vehicle having a projection unit according to the invention.

These objects are achieved by a motor vehicle having at least one projection unit for projecting graphical or visual information onto a projection surface. A road surface or a wall in the environment of the vehicle are used in particular as projection surface. A projection unit in the sense of the invention is optionally a digital projection unit that is able to project changeable graphical or visual information onto the projection surface, or a conventional projection unit that is designed to generate a projection of graphical or visual information that is unchanging in terms of content in the environment of the vehicle. To this end, the projection unit is installed as a stand-alone component for example on or in an exterior mirror, a door sill or a front or rear apron of the motor vehicle. The projection unit comprises a light source that is able to output a merely limited luminous flux by design. In typical projection units for projecting graphical or visual information, for example onto the road surface, the luminous flux is of orders of magnitude of 20 lm, 40 lm or 100 lm on account of efficiency losses on the projection surface. This is in particular considerably lower than the luminous flux of a motor vehicle light. The projection unit is installed in the motor vehicle in particular such that it illuminates the projection surface obliquely.

The projection unit is connected to a monitoring circuit of the motor vehicle. The monitoring circuit is designed to project the graphical or visual information. The monitoring circuit may for example be formed by a controller of the motor vehicle. Likewise, the monitoring circuit may be implemented in a controller that is already installed in the motor vehicle, for example a central controller.

The monitoring circuit comprises a brightness sensor for determining a value of the brightness in the environment of the motor vehicle, and a computing unit for controlling the size of the projection on the projection surface by the projection unit on the basis of the value of the ambient brightness as received from the brightness sensor.

Any static information that contains a lighting effect, such as for example a manufacturer logo or an image, may be considered in principle as information to be projected. However, other information, in particular information containing variable and/or time-variable content, may also be considered as information.

Determining a value of the brightness in the environment of the motor vehicle using a brightness sensor has the advantage that the size of the projection is able to be varied on the basis of the brightness in the environment. A high-quality projection that is able to be recognized readily by observers may thus be displayed at any time of day or in any light situation.

This procedure is based on the observation that projection units, which, on account of their installation situation in the motor vehicle and/or on account of their light source and/or their optical system, have a limited luminous flux, do not allow the projection on the projection surface to appear with uniform brightness. This is the case with projection units that illuminate the projection surface obliquely, such as for example in the case of a light carpet in the lateral region of the motor vehicle. In this case, the projection on the projection surface exhibits a large drop in brightness away from the projection unit, such that only the brightest region that is located close to the projection unit is readily visible, while the projection becomes increasingly dark moving further away from the projection unit. By adapting the size of the projection on the projection surface by the projection unit on the basis of the value of the ambient brightness as received from the brightness sensor, it is possible to generate a high-quality projection in different ambient conditions by avoiding dark regions in the projection.

Expediently, the brightness sensor is a light sensor and/or rain sensor for controlling running lights and/or a windscreen wiper of the motor vehicle. It is thereby possible for example to use the threshold value used for activating the windscreen wiper and/or running light to control the size of the projection on the projection surface. As an alternative, other threshold values for the value of the ambient brightness as determined by the light sensor and/or rain sensor may be defined for controlling the size of the projection on the projection surface.

In another embodiment, the brightness sensor may be a camera the image field of which records the projection surface. Image processing then makes it possible to ascertain a value of the ambient brightness. To this end, in the same way as the abovementioned threshold values of a light sensor and/or rain sensor, it is possible to define values that are determined from the overall image field recorded by the camera, or a subregion that comprises only the projection surface, through image processing.

A further expedient embodiment makes provision that the projection unit is a digital projection unit, wherein the size of the projection that comprises the graphical or visual information on the projection surface is variable. According to this embodiment, provision is made to illuminate a larger or smaller region of the projection surface using the digital projection unit depending on the ambient brightness. Thus, for example, in the event of a dark environment, the projection surface may be illuminated with the graphical or visual information over a large area. The term "over a large area" should be understood to mean here that the projection on the projection surface has a large size and/or takes up a large area that is theoretically as large as possible on account of the installation situation and/or the technical design of the projection unit in the motor vehicle. In the event of a comparatively brighter ambient brightness, only a comparatively smaller surface area of the projection surface may be illuminated by the digital projection unit.

In another embodiment, the projection unit is oriented relative to the projection surface between at least two positions by an actuator in order to vary the size of the projection on the projection surface on the basis of the value received from the brightness sensor. By way of example, the projection unit or an optical system of the projection unit may be tilted between the at least two positions by the actuator. This embodiment is particularly suitable for conventional analog projection units, but may also be used in conjunction with digital projection units.

The size of the projection on the projection surface, in a situation in which the maximum possible theoretical area is not utilized, may be controlled by displaying the graphical or visual information only partially. As an alternative, in the situation in which the maximum possible theoretical area is not utilized, the graphical or visual information may be displayed with a reduced size.

A further expedient embodiment makes provision that the monitoring circuit is designed, in the event of a recorded value of the ambient brightness that is above a predefined threshold value, to project the graphical or visual information only in a subregion of the maximum possible theoretical area on the projection surface. In other words, this embodiment is used when the ambient brightness is comparatively high. Expediently, the subregion is in the region of the maximum possible theoretical area on the projection surface that is at a small distance from the projection unit.

In another embodiment, the monitoring circuit is designed, in the event of a recorded value of the ambient brightness that is below the predefined threshold value, to project the graphical or visual information completely in the maximum possible theoretical area on the projection surface. This embodiment is used in particular when the ambient brightness is comparatively low, for example at night, or when parking the vehicle in a dark environment, for example a garage, underground garage and the like.

The invention furthermore proposes a method for operating a motor vehicle having at least one projection unit for projecting graphical or visual information onto a projection surface. To this end, the projection unit is connected to a monitoring circuit of the motor vehicle, which monitoring circuit is designed to project the graphical or visual information. The method comprises the steps of determining a value of the brightness in the environment of the motor vehicle, and controlling the size of the projection on the projection surface by the projection unit on the basis of the value of the ambient brightness as received from the brightness sensor. The method has the same advantages as have been described above in connection with the motor vehicle according to the invention.

Expediently, in the event of a recorded value of the ambient brightness that is above a predefined threshold value, the graphical or visual information is projected only in a subregion of a maximum possible theoretical area on the projection surface.

A further expedient embodiment makes provision that, in the event of a value of the ambient brightness that is below the predefined threshold value, the graphical or visual information is projected completely in the maximum possible theoretical area on the projection surface.

The invention is described in more detail below on the basis of one exemplary embodiment with reference to the accompanying figures.

DETAILED DESCRIPTION OF THE DRAWINGS

Figure 1:
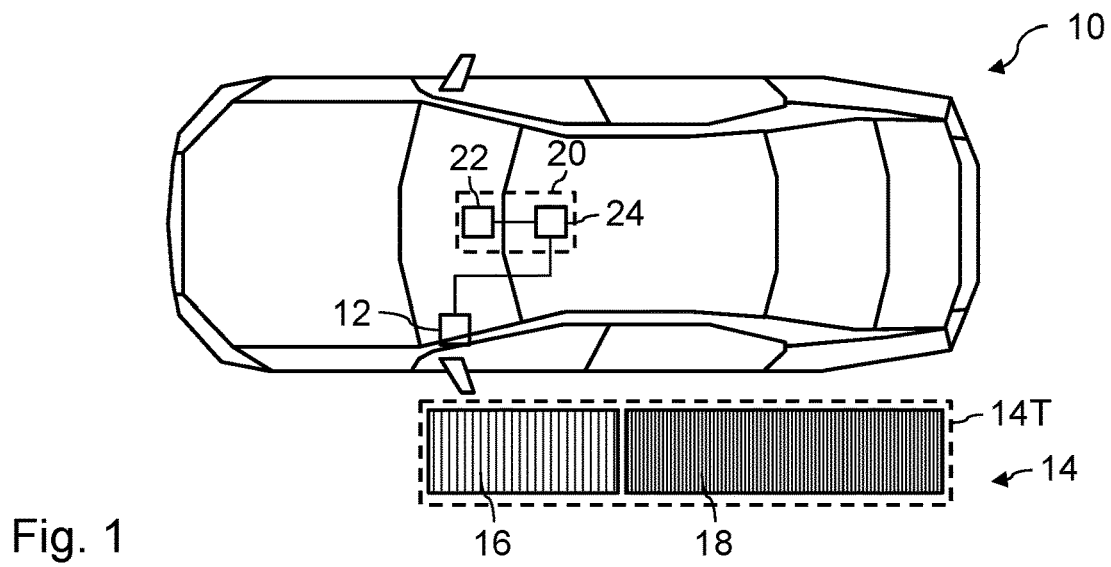
FIG. 1 shows a schematic illustration of a motor vehicle according to an exemplary embodiment of the invention in a plan view, wherein a projection on a projection surface, which projection is generated by a projection unit of the motor vehicle, is illustrated on a left-hand vehicle side by way of example.

FIG. 1 shows a schematic illustration of a motor vehicle 10 according to an exemplary embodiment of the invention in a plan view. The motor vehicle 10 comprises a projection unit 12 and a monitoring circuit 20. The projection unit 12 is designed for example as a (digital) projector and/or comprises a microlens array. The monitoring circuit 20 comprises at least one brightness sensor 22 and a computing unit 24, wherein the computing unit 24 is connected both to the brightness sensor 22 and to the projection unit 12 in order to exchange data. The computing unit 24 may be a controller of the monitoring circuit 20 or a central controller of the motor vehicle 10.

The projection unit 12 is designed to project graphical or visual information onto a projection surface 14. In the present exemplary embodiment, the projection surface 14 is on the ground, on the left next to the motor vehicle 10. This is purely exemplary, and the projection surface 14 may also be on the right-hand side of the motor vehicle 10 or in front of or behind the motor vehicle and the like. The projection surface may also be a wall.

The graphical or visual information may be a manufacturer logo. The graphical or visual information may alternatively also be other information that is in particular temporally and/or spatially changeable. Depending on the information to be projected by the projection unit 12 onto the projection surface 14, the projection unit 12 may be arranged in a door sill, in an exterior mirror (illustrated here) of the motor vehicle 10 or another component of the motor vehicle 10.

The graphical or visual information, as illustrated in FIG. 1, is projected as standard onto the projection surface 14 such that the projection on the projection surface 14 has a size and/or takes up an area that is theoretically as large as possible on account of the installation situation and/or the technical design of the projection unit in the motor vehicle. This maximum possible theoretical area is identified with the reference sign 14T and a broken line.

The brightness sensor 22, which is for example a light sensor and/or rain sensor for controlling running lights and/or a windscreen wiper of the motor vehicle, is designed to determine a value of the brightness in the environment of the motor vehicle 10. The value of the brightness in the environment of the motor vehicle 10 as determined by the brightness sensor 22 is transferred to the computing unit 24 in order to control the projection unit 12.

The computing unit 24 is designed, from the value of the brightness of the environment, to control the size of the projection on the projection surface 14 on the basis of the value of the ambient brightness as received from the brightness sensor 22. The projection unit 12 then projects the graphical or visual information with the determined size onto the projection surface 14, specifically on the basis of the value of the ambient brightness as received from the brightness sensor 22.

This procedure is based on the observation that, on account of the installation situation of the projection unit 12 in the motor vehicle and/or on account of its light source and/or its optical system, the information from the projection on the projection surface 14 is at least partially able to be recognized only with difficulty depending on the ambient conditions. In FIG. 1, in a first subregion 16 of the projection surface 14 that is located closer to the projection unit 12, the information from the projection is thus able to be recognized well in bright ambient conditions, while in a second subregion 18 of the projection surface 14, which is further away from the projection unit 12, the information is more difficult to recognize or is even no longer able to be recognized at all in bright ambient conditions. This problem exists in particular in projection units that illuminate the projection surface 14 obliquely, such as for example in the case of the known light carpet, in which there is a large drop in brightness away from the projection unit 12, meaning that, in certain ambient conditions, only the brightest information, in the first subregion 16 of the projection surface 14, is visible (see the example in FIG. 1).

Figure 2:
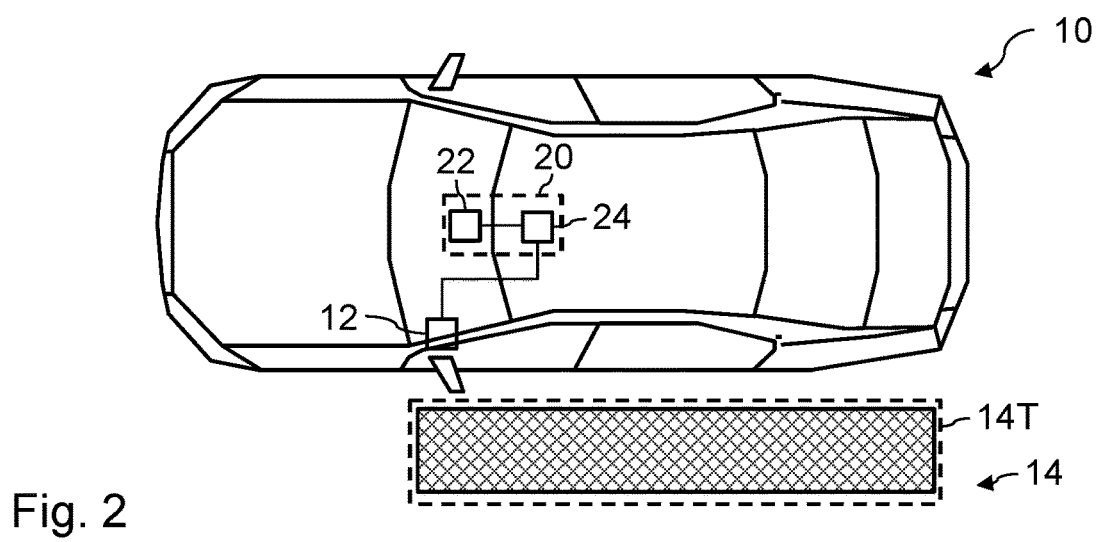
FIG. 2 shows the motor vehicle shown in FIG. 1, reproducing the projection onto the projection surface when using a digital projection unit in first, dark ambient conditions.
Figure 3:
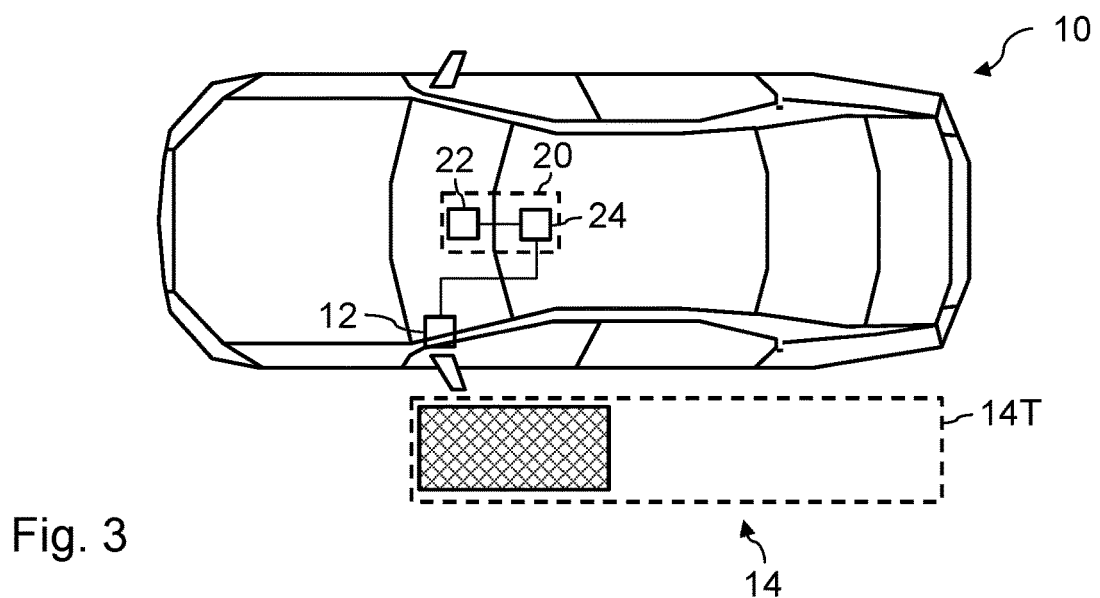
FIG. 3 shows the motor vehicle shown in FIG. 2, reproducing the projection onto the projection surface when using the digital projection unit in second, comparatively bright ambient conditions.

FIGS. 2 and 3 show a first exemplary embodiment as to how this problem is able to be countered in the case of a digital projection unit 12. In FIG. 2, the situation is illustrated here in first, dark ambient conditions, while FIG. 3 illustrates the situation in second, comparatively bright ambient conditions. The graphical or visual information from the projection is symbolized in each case by a hatched rectangle, wherein the projection may in practice of course also have other boundary shapes.

While the maximum possible theoretical area 14T on the projection surface 14 is utilized completely by the projection in dark ambient conditions, only a subregion, which may correspond for example to the first subregion 16 from FIG. 1, of the maximum possible theoretical area 14T on the projection surface 14 is used for the projection by the projection unit 12 in bright ambient conditions. In the case of a digital projection unit, the maximum possible theoretical projection area 14T may in this case be used to between 100% and a few percent of its potential degree of use depending on the ambient conditions. In this case, the graphical or visual information may be displayed with a reduced size by the projection, or only an excerpt of the complete graphical or visual information may be displayed.

Figure 4:
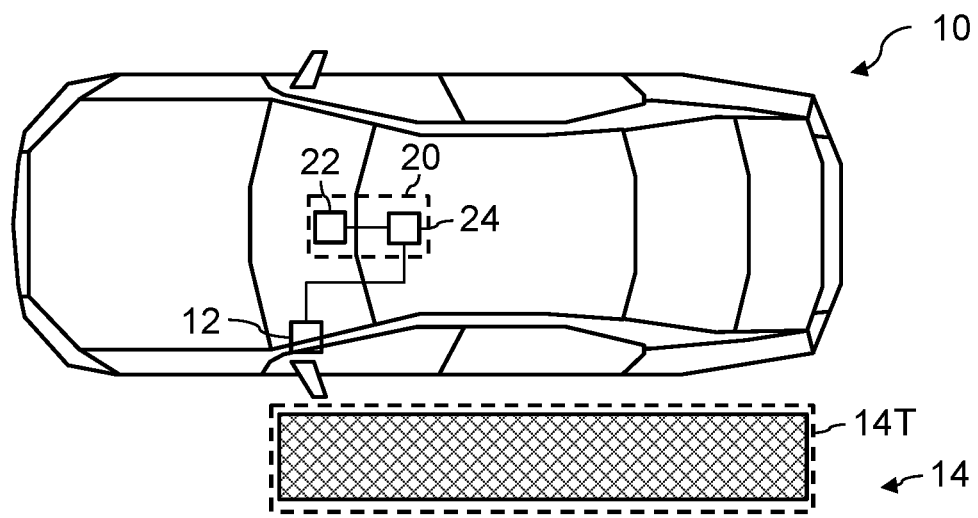
FIG. 4 shows the motor vehicle shown in FIG. 1, reproducing the projection onto the projection surface when using a mechanically changeable projection unit in first, dark ambient conditions.
Figure 5:
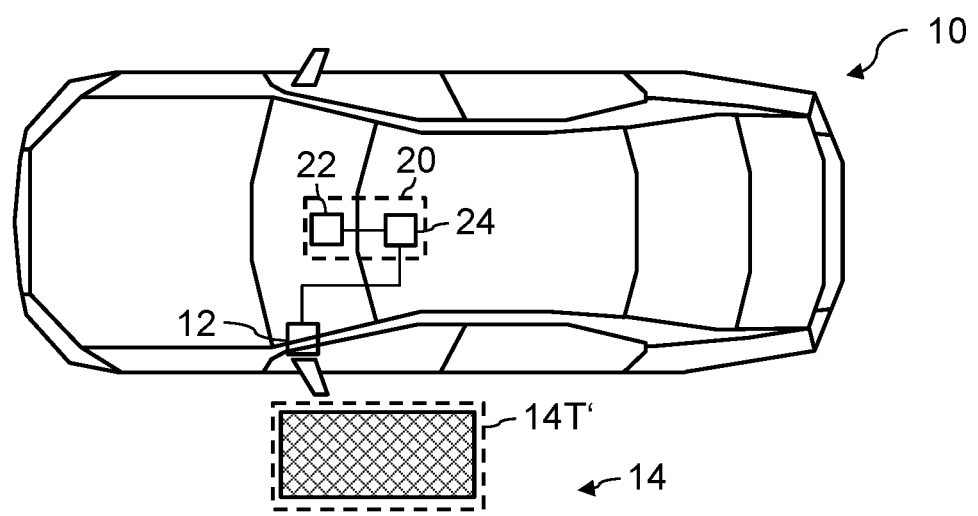
FIG. 5 shows the motor vehicle shown in FIG. 4, reproducing the projection onto the projection surface when using the mechanically changeable projection unit in second, comparatively bright ambient conditions.

FIGS. 4 and 5 show a further exemplary embodiment in which the projection unit 12 is pivoted or tilted between a first and at least one second position by the computing unit 24 depending on the value of the brightness in the environment as recorded by the brightness sensor 22. In this case, according to the exemplary embodiment illustrated in FIG. 4, in dark ambient conditions, the maximum possible theoretical area 14T on the projection surface 14 is utilized. In bright ambient conditions (FIG. 5), the projection unit 12 and/or its optical system are/is tilted, such that the maximum possible theoretical area 14T' on the projection surface 14 amounts to only a portion of the maximum possible theoretical area 14T from FIG. 4. As a result of the tilting of the projection unit 12, the graphical or visual information is displayed completely here, but with a reduced size. Slight distortions may possibly occur here.

As an alternative to tilting, the projection unit 12 may be varied between the at least two positions by a lens movement and/or a change in the optics of the projection unit 12, such that a smaller or larger region of the optics of the projection unit 12 is illuminated.

The control performed by the computing unit 24 as to whether the maximum possible theoretical projection surface is utilized to the maximum extent (in dark conditions) or not (in comparatively brighter ambient conditions) may be regulated using threshold values. In the event of a recorded value of the ambient brightness that is above a predefined threshold value, the graphical or visual information may be projected only in a subregion of the maximum possible theoretical area 14T onto the projection surface 14. In this case, as has been explained above, the subregion that is at a smaller distance from the projection unit 12 is illuminated by the projection unit 12. By contrast, in the event of a recorded value of the ambient brightness that is below the predefined threshold value, the graphical or visual information is projected completely into the maximum possible theoretical area 14T on the projection surface 14.

It goes without saying that not just one threshold value but rather a plurality of threshold values could be defined, such that areas of different size up to the maximum possible theoretical area on the projection surface are utilized for the projection of the graphical or visual information. This determination is performed by the monitoring circuit 20, and in particular its computing unit 24.

LIST OF REFERENCE SIGNS

10 motor vehicle
12 projection unit
14 projection surface
14T maximum possible theoretical area of the projection on the projection surface
14T' maximum possible theoretical area of the projection on the projection surface
16 first (bright) subregion of the projection surface
18 second (dark) subregion of the projection surface
20 monitoring circuit
22 brightness sensor
24 computing unit

The invention claimed is:

1. A motor vehicle comprising:
a projection unit that is configured to project graphical or visual information onto a projection surface; and
a monitoring circuit, wherein:
the projection unit is connected to the monitoring circuit, and
the monitoring circuit comprises a brightness sensor for determining a value of brightness in an environment of the motor vehicle and a computing unit for controlling a size of a projection on the projection surface by the projection unit based on the value of the brightness as received from the brightness sensor.

2. The motor vehicle according to claim 1, wherein the brightness sensor is a light sensor and/or a rain sensor for controlling running lights and/or a windscreen wiper of the motor vehicle.

3. The motor vehicle according to claim 1, wherein the brightness sensor is a camera, an image field of which camera records the projection surface.

4. The motor vehicle according to claim 1, wherein:
the projection unit is a digital projection unit, and
a size of the projection on the projection surface is variable by digital image information that contains the graphical or visual information and that is supplied to the projection unit as input information.

5. The motor vehicle according to claim 1, wherein an orientation of the projection unit relative to the projection surface is variable between at least two positions by an actuator in order to vary the size of the projection on the projection surface based on the value received from the brightness sensor.

6. The motor vehicle according to claim 5, wherein optics of the projection unit are tiltable between the at least two positions by the actuator.

7. The motor vehicle according to claim 1, wherein the monitoring circuit is configured, in an event of the value of the brightness being above a predefined threshold value, to project the graphical or visual information only in a subregion of a maximum possible theoretical area on the projection surface.

8. The motor vehicle according to claim 7, wherein the subregion is located in the region of the maximum possible theoretical area on the projection surface that is at a small distance from the projection unit.

9. The motor vehicle according to claim 1, wherein the monitoring circuit is configured, in an event of the value of the brightness being below a predefined threshold value, to project the graphical or visual information completely in a maximum possible theoretical area on the projection surface.

10. A method for operating a motor vehicle having a projection unit for projecting graphical or visual information onto a projection surface, wherein the projection unit is connected to a monitoring circuit of the motor vehicle, the method comprising:
determining, by a brightness sensor of the monitoring circuit, a value of brightness in an environment of the motor vehicle, and
controlling a size of the projection on the projection surface by the projection unit based on the value of the brightness as received from the brightness sensor.

11. The method according to claim 10, wherein, in an event of the value of the brightness being above a predefined threshold value, the graphical or visual information is projected only in a subregion of a maximum possible theoretical area on the projection surface.

12. The method according to claim 10, wherein, in an event of the value of the brightness being below a predefined threshold value, the graphical or visual information is projected completely in a maximum possible theoretical area on the projection surface.

* * * * *